United States Patent
Ibrahim

(10) Patent No.: US 8,453,142 B2
(45) Date of Patent: May 28, 2013

(54) VIRTUAL MACHINE CONTROL

(75) Inventor: Wael M. Ibrahim, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1345 days.

(21) Appl. No.: 11/740,617

(22) Filed: Apr. 26, 2007

(65) Prior Publication Data

US 2008/0271015 A1  Oct. 30, 2008

(51) Int. Cl.
*G06F 9/455* (2006.01)
*G06F 9/46* (2006.01)
*G06F 15/173* (2006.01)

(52) U.S. Cl.
USPC ............... 718/1; 718/100; 718/102; 718/104; 709/223; 709/224; 709/226

(58) Field of Classification Search
USPC .............................................. 718/1; 709/203
See application file for complete search history.

(56) References Cited

U.S. PATENT DOCUMENTS

| | | | | |
|---|---|---|---|---|
| 6,324,177 | B1 * | 11/2001 | Howes et al. | 370/389 |
| 6,490,445 | B1 * | 12/2002 | Holmes | 455/419 |
| 7,356,576 | B2 * | 4/2008 | Rabe | 709/221 |
| 7,356,679 | B1 * | 4/2008 | Le et al. | 713/1 |
| 7,577,722 | B1 * | 8/2009 | Khandekar et al. | 709/220 |
| 2002/0069335 | A1 * | 6/2002 | Flylnn, Jr. | 711/153 |
| 2002/0069369 | A1 * | 6/2002 | Tremain | 713/201 |
| 2002/0120660 | A1 * | 8/2002 | Hay et al. | 709/100 |
| 2002/0194482 | A1 * | 12/2002 | Griffin et al. | 713/176 |
| 2005/0198303 | A1 * | 9/2005 | Knauerhase et al. | 709/227 |
| 2005/0246711 | A1 * | 11/2005 | Berstis et al. | 718/105 |
| 2006/0294517 | A1 * | 12/2006 | Zimmer et al. | 718/1 |
| 2007/0234302 | A1 * | 10/2007 | Suzuki et al. | 717/126 |
| 2008/0089338 | A1 * | 4/2008 | Campbell et al. | 370/392 |
| 2008/0098392 | A1 * | 4/2008 | Wipfel et al. | 718/1 |
| 2008/0163210 | A1 * | 7/2008 | Bowman et al. | 718/1 |
| 2008/0168158 | A1 * | 7/2008 | Bantz et al. | 709/219 |
| 2009/0094316 | A1 * | 4/2009 | Chen et al. | 709/203 |

FOREIGN PATENT DOCUMENTS

KR   10-1995-0703236   8/1995

OTHER PUBLICATIONS

ISA/KR, Notification of Transmittal of the International Search Report and Written Opinion, Apr. 24, 2008, PCT/US2008/005351.

* cited by examiner

*Primary Examiner* — Emerson Puente
*Assistant Examiner* — Charles Swift

(57) ABSTRACT

A method comprises receiving a request for data from a client computer. The method further comprises obtaining an identifier of a virtual machine. The virtual machine identifier is associated with the requested data. The method further comprises providing the virtual machine identifier to the client computer.

18 Claims, 2 Drawing Sheets

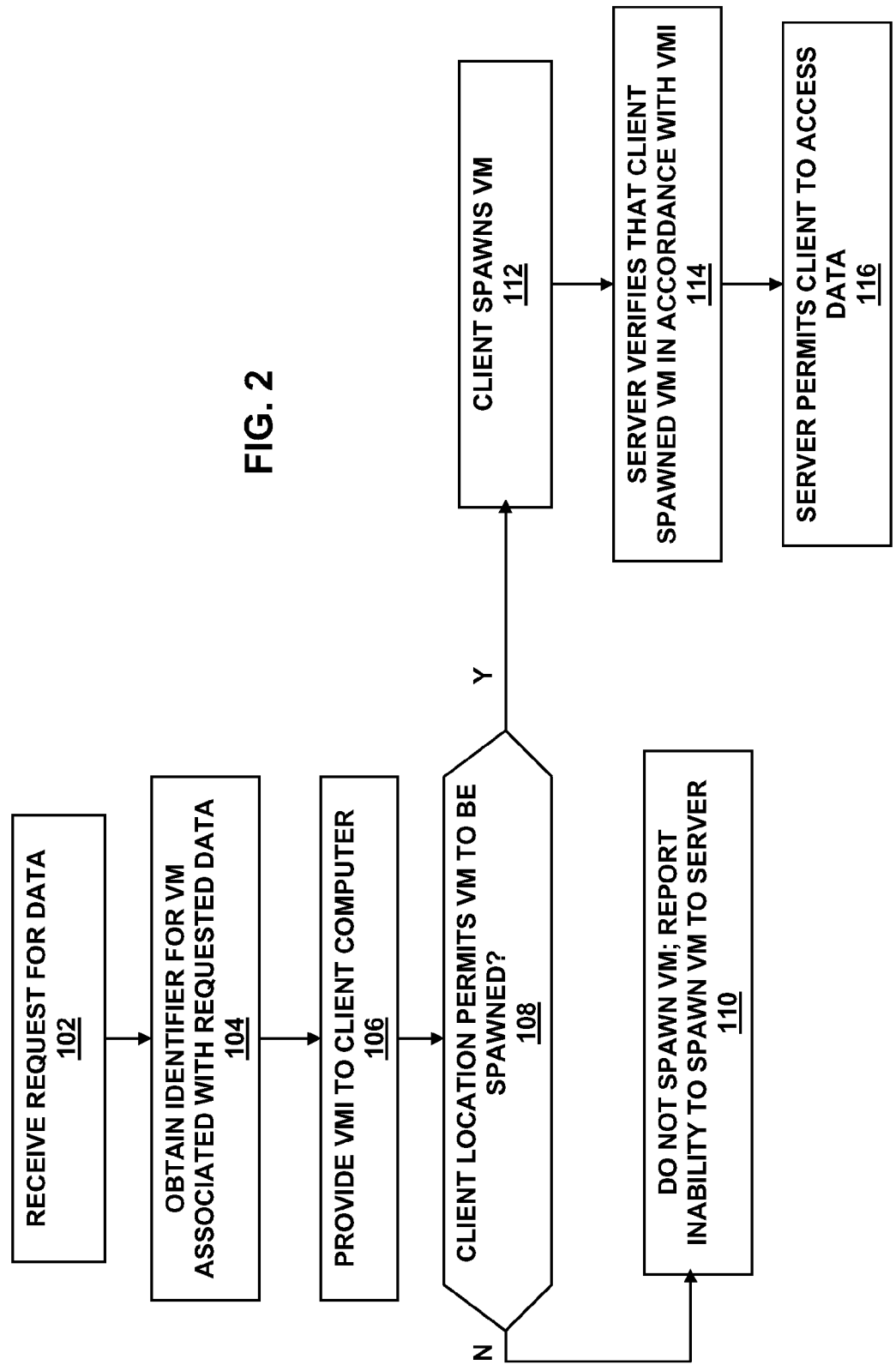

VIRTUAL MACHINE CONTROL

BACKGROUND

Mobile computing devices have become ubiquitous in today's economy. Such devices, while practical and useful, also may expose security issues. For example, if such a device were stolen, an unauthorized entity could access sensitive data stored remotely from the device but accessible via the device. In one scenario, an unauthorized entity, in unlawful possession of a notebook computer, could use the notebook computer to access sensitive data stored on a remote server.

BRIEF DESCRIPTION OF THE DRAWINGS

For a detailed description of exemplary embodiments of the invention, reference will now be made to the accompanying drawings in which:

FIG. 2 shows a method in accordance with various embodiments.

NOTATION AND NOMENCLATURE

Figure 1:
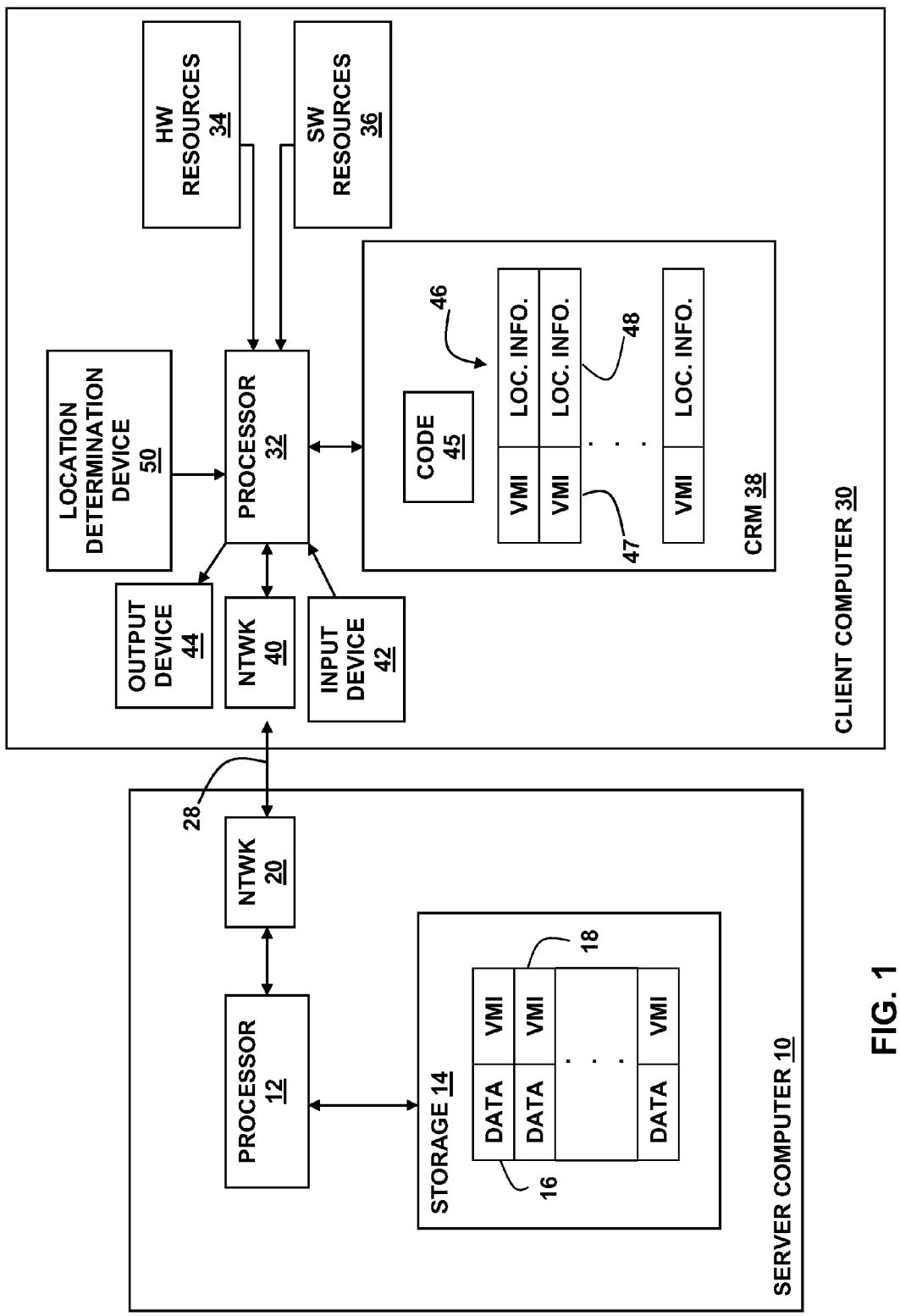
FIG. 1 shows a system in accordance with various embodiments.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. The term "system" refers to a combination of two or more components. A system may comprise, for example, the combination of a server and a client communicatively coupled thereto, or a server alone, a client alone, or a subsystem within a computer.

DETAILED DESCRIPTION

FIG. 1 shows a server computer 10 communicatively coupled to a client computer 30 via a network 28. In various embodiments, network 28 comprises a local area network (LAN), a wide area network (WAN), or other types of networks. Server computer 10 comprises a processor 12 coupled to storage 14 and a network interface 20. At least the processor 12 comprises logic that, in various embodiments, performs some or all of the functionality described herein attributable to the server computer 10. Storage 14 comprises a computer-readable medium such as volatile memory (e.g., random access memory), non-volatile storage (e.g., hard disk drive, Flash memory, compact disc read-only memory (CD ROM), etc.), and combinations thereof. Storage 14 comprises one or more data items 16 accessible to, in light of various security mechanisms described herein, client computer 30. Storage 14 may be integrated into server computer 10, or may be provided separate from the server computer.

Client computer 30 comprises a processor 32, one or more hardware resources 34, one or more software resources 36, a computer-readable medium (CRM) 38, a network interface 40, and input device 42 and an output device 44. In various embodiments, client computer 30 also comprises a location determination device 50. In various embodiments, location determination device 50 comprises a global positioning system (GPS) receiver or other mechanism that permits the client computer 30 to determine its physical location within a room, a building, a city, or any place on earth (within the ability of the location determination device).

The input device 42 comprises a mouse, a trackball, a keyboard, or other type of data entry and/or pointing device. The output device 44 comprises a display or other type of device by which a user of the client computer 30 can view one or more of the data items 16 stored on the server computer 10. Via interaction with input device 42 and output device 44, a user of the client computer 30 can request access to, and view, one or more data items 16 from the server computer 10.

Each of the server computer 10 and client computer 30 comprises a network interface (interfaces 20 and 40 as shown). Such network interfaces 20 and 40 enable the server and client computers 10 and 30 to communicate with one another via network 28. In various embodiments each network interface comprises a network interface controller (NIC).

The hardware resources 34 in the client computer 30 comprise various configurable resources such as memory, input/output (I/O), ports, etc. Software resources 36 comprise such resources as one or more various and possibly disparate operating systems (e.g., Windows, LINUX, etc.) as well as various applications, virus signatures, basic input/output system (BIOS) versions, operating system service packs, etc.

Computer readable medium 38 comprises code 45 executable by processor 32. Code 45 is executable by processor 32. At least the processor 32 executing code 45 comprises logic that enables the client computer 30 to perform one or more of the actions described herein attributable to the client computer 30.

In operation, a user of client computer 30 requests access to one or more data item 16 and the server computer 10. In various embodiments, server computer 10 forces the client computer 30 to spawn a specific "virtual machine" before the server 10 provides the requested data to the client computer 30. Client computer 30 is capable of spawning any one or more of multiple virtual machines available on the client computer 30. A virtual machine is an operating environment working in conjunction with, yet independent of, a host operating system. A virtual machine is thus a self-contained operating environment that behaves as if it is a separate computer.

Referring still to FIG. 1 and in accordance with various embodiments, one or more of the server computer's data items 16 is associated with a particular virtual machine identifier (VMI) 18. A VMI 18 comprises a value that is associated with a particular virtual machine that must be implemented (i.e., spawned) by a client computer 30 in order for the client computer 30 to receive and view the corresponding data. A VMI may comprise a sequential number, an alphanumeric designation, or any other type of value that uniquely identifies and distinguishes one virtual machine from another. In some embodiments, all of the data items 16 on the sever computer 10 are associated with the same virtual identifier, while in other embodiments, one or more of the data items 16 are associated with a different virtual machine identifier from one or more other data items 16. Some data items 16 may be associated with a VMI 18, while other data items 16 are not associated with a VMI 18.

In some embodiments, each time a data item 16 is created and stored in server computer 10, a user of the server computer (e.g., an administrator) tags the newly stored data item 16 with a particular virtual machine identifier. Such an administrator is thereby able to specify which virtual machine must be spawned by the client computer 30 in order for the client computer 30 to receive and present the data to the user. In this manner, security requirements of the underlying data items are mapped to desired virtual machines that must be used to remotely access the data items.

Upon receipt of a request for a particular data item 16 from the client computer 30, the processor 12 of the server computer 10 obtains the virtual machine identifier associated with the requested data item 16. The processor 12 then provides the virtual machine identifier 18 via network interface 20 to the client computer 30 via network 28. The virtual machine identifier 18 is received by the client computer's processor 32 via the client computer's network interface 40. The processor 32 of the client computer 30 spawns the virtual machine associated with the server computer-specified virtual machine identifier 18. Once the processor 32 has spawned the specified virtual machine, the server 10 provides the requested data item 16 to the client computer 30 for presentation to the client computer's user. In various embodiments, spawning a virtual machine comprises such actions as allocating a specified amount of memory, loading a particular operating system, enabling and disabling specified input/output (I/O) ports, etc. Code 45 comprises a virtual machine monitor (VMM) that spawns the appropriate virtual machines using hardware and software resources 34 and 35. In some embodiments, more than one virtual machine can be spawned at a time.

In accordance with various embodiments, the server computer 10 verifies that the client computer 30 has spawned the correct virtual machine before providing the requested data item 16 to the client computer 30. An example of such verification is through the use of the Trusted Platform Module (TPM)-based mechanism such as that described in U.S. Patent Publication No. 20050235141 entitled "Subordinate Trusted Platform Module," incorporated herein by reference. For example, the client computer 30 after spawning the specified virtual machine, computes one or more metrics of the resulting configuration of the client computer's newly spawned virtual machine, and provides one or more such metrics to the server 10 via network 28. The server 10 compares the received metrics from the client computer 30 to a known legitimate copy of such metrics. If the metrics match, the server determines that the client computer 30 has spawned the correct virtual machine. If the metrics do not match, the server 10, at least in some embodiments, will not provide the requested data item 16 to the client computer 30.

Another security mechanism implemented in the system shown in FIG. 1 is for the client computer 30 to spawn the server-specified virtual machine only if the client computer 30 is physically located at a location commensurate with location information associated the specified virtual machine. In at least some embodiments, location refers to geographic location such as that defined by a longitude and latitude.

Computer readable medium 38 comprises a dataset 46 that provides, for each of one or more virtual machine identifiers 47, location information 48. Each location information 48 specifies, in various embodiments, a range of locations at which the client computer 30 must be physically present for the client computer 30 to spawn the virtual machine associated with the virtual machine identifier 47. In other embodiments, the location information 48 defines one or more locations at which the client computer 30 must not spawn the virtual machine associated with a corresponding virtual machine identifier 47, and thus indirectly specifies the allowable location for the virtual machine.

Based on the location information 48, the processor 32 of the client computer 30 compares the client computer's current location as provided, for example, by the location determination device 50, to the location information 48 of CRM 38 to determine whether the client computer 30 is presently located at a location at which the client computer is permitted to spawn the server-specified virtual machine. If the client computer 30 is located at such a suitable location (as defined by the dataset 46), the processor 32 spawns the specified virtual machine. On the other hand, if the client computer 30 is not at a location that permits the client computer to spawn the specified virtual machine, the processor 32 precludes the requested virtual machine from being spawned, and as a result, the client computer 30 is not permitted to receive the requested data item 16 from the server computer 10.

FIG. 2 illustrates a method in accordance with various embodiments of the invention. The actions listed in FIG. 2 can be performed in a different order from that shown, and various actions can be performed concurrently. At 102, the method comprises receiving a request for a particular data item from the client computer 30. At 104, the method further comprises obtaining an identifier of a virtual machine associated with the requested data. At 106, the method also comprises providing the virtual machine identifier from the server 10 to the client 30 over network 28.

At 108, the client computer 30 determines whether its location is such that the specified virtual machine can be spawned on the client computer 30. If the client computer's location is not suitable for spawning the specified virtual machine, then at 110, the method precludes the client computer 30 from spawning the specified virtual machine. Further, the client computer 30 may report its inability to spawn the specified virtual machine to the server 10. This alert may indicate that client computer 30 has been stolen. As a result of receiving this alert from the client computer 30, the server will not provide the requested data item 16 to the client computer 30. Additionally or alternatively, the server computer 10 may enact one or more security mechanisms such as alerting a network administrator that the client computer 30 requested a particular data item but failed to spawn the correct virtual machine.

At 108, the client computer may determine that its present location does fall within the range of locations that permits the client computer 30 to spawn the server-specified virtual machine. Accordingly, at 112, the method further comprises the client computer 30 spawning the specified virtual machine. At 114, the server computer 10 verifies that the client computer 30 spawned the correct virtual machine in accordance with the virtual machine identifier provided to the client computer 30 by the server computer 10. At 116, the server computer 10 permits the client computer 30 to access the data and thus provides such data to the client computer 30 if the server computer 10 successfully verifies that the client computer spawned the correct virtual machine.

In the embodiment shown in FIG. 1, the client computer 30 comprises a location determination device 50 by which the client computer determines its present location. In other embodiments, however, the mechanism by which the client computer's location is determined is not part of the client computer, but is provided apart from the client computer 30. For example, a location attestation service (LAS) is implemented to determine whether the client computer's location comports with a location-requirement tagged to the data a user of the client computer wishes to view. An example of such a location attestation service is described in copending application entitled "Location Attestation Service," serial no. 11/709,473, incorporated herein by reference. Using such an LAS, client computer 30 submits a request for the server computer's data to the server computer 10. The server computer 10 request for proof of location from the client computer 30. The client computer 30 searches for a location attestation service interface device (LASID) (e.g., one LASID per location area). The LASID contacts a management server, which may be server computer 10 or a different server, and grants a location certificate to the client computer device 30. The client computer 30 then presents the location certificate to the server computer 10, which thereby verifies that the client computer's location permits the required virtual machine to be spawned.

In accordance with another example, decision 108 in FIG. 2 is performed by the server computer 10 requesting the location of the client computer 30 from the client computer 30. The client computer 30 provides its location to the server 10. The server 10 compares the client computer's location to location information that may also be tagged to each data item 16. Thus, in this embodiment, each data item 16 comprises a virtual machine identifier 18 that specifies the virtual machine that is to be spawned by the client computer 30 as well as location information which defines the locations at which the corresponding virtual machine can be spawned by the client computer 30. If the server 10 determines that the client computer 30 is present at the correct location, the server computer 10 asserts a signal back to the client computer 30 authorizing the client computer 30 to spawn the server-specified virtual machine. Otherwise, the server computer 10 precludes the client computer 30 from spawning the specified virtual machine.

In accordance with various embodiments, the client computer 30 monitors its location and terminates a spawned virtual machine if the client computer 30 is no longer at a location at the virtual machine is permitted to be spawned. Termination of a virtual machine destroys partitions of the virtual machine as well as any associated secrets, keys, etc. Thus, if the client computer 30 is mobile and is moved from one location to another while a virtual machine is spawned, the client computer 30 will terminate the virtual machine if the virtual machine is not permitted at the new location. The client computer 30, or whatever device determines the client computer's location and ensures that the location is appropriate for the target virtual machine, continually or periodically (e.g., once per minute, once every 5 minutes, etc.), or through an event-driven mechanism such as the loss of a location signal from a location determination device, monitors the location and compliance with the location requirement of the server data being accessed by the client computer 30.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
   receiving, from a client computer, a request for a data item, said requested data item stored with a plurality of data items that can be requested by the client computer, each data item tagged with a virtual machine identifier that identifies a particular virtual machine to be spawned by the client computer to access the requested data item;
   obtaining the virtual machine identifier tagged to the requested data item;
   based on a geographic location of the client computer, determining whether the client computer is permitted to spawn a particular virtual machine identified by the obtained virtual machine identifier; and
   spawning, by the client computer said virtual machine identified by the virtual machine identifier based on the client computer being geographically positioned at a particular geographic location commensurate with the virtual machine to be spawned.

2. The method of claim 1 wherein spawning the particular virtual machine comprises implementing a hardware and software configuration on the client computer, said configuration being associated with the obtained virtual machine identifier.

3. The method of claim 1 further comprising verifying whether the client computer spawned the particular virtual machine in accordance with said provided virtual machine identifier.

4. The method of claim 1 further comprising computing a metric associated with said provided particular virtual machine.

5. The method of claim 4 further comprising comparing said metric to a predetermined metric to verify that the client computer spawned the particular virtual machine in accordance with said obtained virtual machine identifier.

6. The method of claim 1 further comprising using global positioning system (GPS) location data to determine the geographic location.

7. A system, comprising:
   logic; and
   network interface controller coupled to said logic;
   wherein said logic submits a request for data across a network via the network interface controller and receives a response to said request, said response comprising an identifier of a virtual machine, said virtual machine identifier tagged to the requested data and identifying a particular virtual machine to be spawned to access the requested data; and
   wherein the logic is to spawn the particular virtual machine in accordance with said virtual machine identifier and based on whether the system is positioned at a particular geographical location commensurate with the particular virtual machine.

8. The system of claim 7 wherein said logic monitors the system's position and terminates said particular virtual machine if said system is no longer at a position at which said particular virtual machine is permitted to be spawned.

9. The system of claim 7 further comprising a location determination device that provides a location of the system to said logic, and said logic determines whether to spawn the particular virtual machine based on said system's location.

10. The system of claim 9 wherein the location determination device comprises a global positioning system (GPS) receiver.

11. The system of claim 7 further comprising storage specifying, for at least one virtual machine, a location at which said particular virtual machine can be spawned.

12. The system of claim 7 wherein the logic provides information across the network by which a remote device verifies that the system spawned the particular virtual machine in accordance with said virtual machine identifier.

13. The system of claim 12 wherein the logic does not spawn the particular virtual machine until the system's network interface controller receives confirmation from the remote device that the remove device has successfully verified that the system spawned the particular virtual machine in accordance with said virtual machine identifier.

14. A system, comprising:
   logic; and network interface controller coupled to said logic;
wherein said logic receives a remote device a request for a data item from a network via the network interface along with a geographical location of the remote device, said requested data item stored with a plurality of data items that can be requested, each data item tagged with a virtual machine identifier that identifies a particular virtual machine to be spawned to access the requested data item, and said logic obtains an identifier of a virtual machine based on said requested data item; and
wherein said logic determines whether the remote device's geographical location permits the remote device to spawn the particular virtual machine and, based on the remote device's geographical location permitting the remote device to spawn the particular virtual machine, the logic provides said virtual machine identifier across said network to the remote device.

15. The system of claim 14 wherein said logic verifies whether a remote device that received said virtual machine identifier spawned the particular virtual machine associated with said virtual machine identifier.

16. The system of claim 14 wherein said logic receives a metric from a remote device that received said virtual machine identifier, and said logic uses said metric to verify that the remote device spawned the particular virtual machine associated with said virtual machine identifier.

17. The system of claim 14 wherein at least one data item is tagged with a different virtual machine identifier than another data item.

18. The system of claim 14 wherein said logic receives global positioning system (GPS)-based location of a remote device, that received said virtual machine identifier, to determine whether the remote device is to spawn the particular virtual machine associated with said virtual machine identifier.

* * * * *

UNITED STATES PATENT AND TRADEMARK OFFICE
CERTIFICATE OF CORRECTION

PATENT NO. : 8,453,142 B2
APPLICATION NO. : 11/740617
DATED : May 28, 2013
INVENTOR(S) : Wael M. Ibrahim Page 1 of 1

It is certified that error appears in the above-identified patent and that said Letters Patent is hereby corrected as shown below:

In the Claims:

In column 6, line 3, in Claim 1, delete "computer" and insert -- computer, --, therefor.

In column 6, line 63, in Claim 13, delete "remove" and insert -- remote --, therefor.

Signed and Sealed this
Seventeenth Day of September, 2013

Teresa Stanek Rea
*Deputy Director of the United States Patent and Trademark Office*